United States Patent
Karlsson et al.

(10) Patent No.: US 10,640,119 B2
(45) Date of Patent: May 5, 2020

(54) METHOD TO CONTROL A POWERTRAIN IN A VEHICLE

(71) Applicant: VOLVO TRUCK CORPORATION, Göteborg (SE)

(72) Inventors: Lars Karlsson, Göteborg (SE); Johan Bjernetun, Mölnlycke (SE); Anders Eriksson, Torslanda (SE)

(73) Assignee: VOLVO TRUCK CORPORATION, Göteborg (SE)

( * ) Notice: Subject to any disclaimer, the term of this patent is extended or adjusted under 35 U.S.C. 154(b) by 138 days.

(21) Appl. No.: 15/508,071

(22) PCT Filed: Oct. 9, 2014

(86) PCT No.: PCT/EP2014/025008
§ 371 (c)(1),
(2) Date: Mar. 1, 2017

(87) PCT Pub. No.: WO2016/055083
PCT Pub. Date: Apr. 14, 2016

(65) Prior Publication Data
US 2017/0305431 A1    Oct. 26, 2017

(51) Int. Cl.
*B60W 30/19* (2012.01)
*B60W 10/06* (2006.01)
(Continued)

(52) U.S. Cl.
CPC ............ *B60W 30/19* (2013.01); *B60W 10/06* (2013.01); *B60W 10/08* (2013.01);
(Continued)

(58) Field of Classification Search
CPC ...... B60W 30/19; B60W 30/00; B60W 30/18; B60W 20/15; B60W 10/00; B60W 10/06;
(Continued)

(56) References Cited

U.S. PATENT DOCUMENTS

| | | | |
|---|---|---|---|
| 4,947,331 A | 8/1990 | Speranza | |
| 5,295,415 A * | 3/1994 | Abe | B60W 10/06 |
| | | | 477/102 |

(Continued)

FOREIGN PATENT DOCUMENTS

| | | |
|---|---|---|
| CN | 201970996 U | 9/2011 |
| CN | 102398579 A | 9/2012 |

(Continued)

OTHER PUBLICATIONS

"Shifting Too Soon is Harder on Motor than Shifting Late" Tom and Ray Magliozzi Published Feb. 13, 1998 found at: https://www.deseretnews.com/article/612820/Shifting-too-soon-is-harder-on-motor-than-shifting-late.html (Year: 1998).*

(Continued)

*Primary Examiner* — Thomas E Worden
(74) *Attorney, Agent, or Firm* — Venable LLP; Jeffri A. Kaminski

(57) ABSTRACT

A method to control a powertrain in a vehicle during an acceleration is provided, the powertrain including a propulsion unit, a multi-clutch transmission drivingly connected to the propulsion unit, and a control unit for controlling at least the powertrain components, which control unit is provided with a prediction model including at least one simulated shift sequence for the multi-clutch transmission. The method involves monitoring at least one operating parameter of the powertrain; estimating the time (tE) between initiation of a first power upshift and initiation of a sequential second power upshift using the prediction model; and, if the estimated time is shorter than a predetermined time limit (tLIM), controlling the propulsion unit to limit the vehicle acceleration so that the time between the first and second power upshifts is increased to be at least equal to the predetermined time limit (tLIM).

7 Claims, 7 Drawing Sheets

(51) Int. Cl.
  *B60W 10/08* (2006.01)
  *B60W 30/18* (2012.01)
  *F16H 61/02* (2006.01)
  *B60W 20/15* (2016.01)
  *B60W 10/113* (2012.01)

(52) U.S. Cl.
  CPC .......... *B60W 10/113* (2013.01); *B60W 20/15* (2016.01); *B60W 30/18* (2013.01); *F16H 61/0213* (2013.01); *B60W 2510/0638* (2013.01); *B60W 2510/081* (2013.01); *B60W 2520/10* (2013.01); *B60W 2540/10* (2013.01); *B60W 2550/14* (2013.01); *B60W 2710/0627* (2013.01); *B60W 2710/0666* (2013.01); *B60W 2710/083* (2013.01); *B60W 2710/086* (2013.01); *B60W 2710/1005* (2013.01); *B60W 2720/106* (2013.01); *B60Y 2200/92* (2013.01); *F16H 2061/0216* (2013.01); *Y10S 903/93* (2013.01)

(58) Field of Classification Search
  CPC .............. B60W 10/08; B60W 10/113; B60W 2510/0638; B60W 2510/081; B60W 2520/10; B60W 2540/10; B60W 2550/14; B60W 2710/0666; B60W 2710/083; B60W 2710/086; B60W 2710/1005; B60W 2720/106; F16H 61/0213; F16H 2061/0216; B60Y 2200/92; Y10S 903/93
  See application file for complete search history.

(56) References Cited

U.S. PATENT DOCUMENTS

| | | | | |
|---|---|---|---|---|
| 5,995,896 | A * | 11/1999 | Depping | ............ F16H 61/0213 477/107 |
| 6,021,370 | A | 2/2000 | Bellinger et al. | |
| 8,909,445 | B2 * | 12/2014 | Swartling | ........... F16H 61/0213 477/148 |
| 2001/0027371 | A1 | 10/2001 | Winner et al. | |
| 2002/0095254 | A1 | 7/2002 | Egawa et al. | |
| 2012/0059560 | A1 | 3/2012 | Balton et al. | |
| 2013/0110360 | A1 * | 5/2013 | Saito | ................... F16H 61/0213 701/51 |
| 2013/0172147 | A1 * | 7/2013 | Razaznejad | ......... F16H 61/0213 477/77 |
| 2015/0184599 | A1 * | 7/2015 | Yokota | .................. B60W 10/06 123/402 |

FOREIGN PATENT DOCUMENTS

| | | |
|---|---|---|
| DE | 10227719 B3 | 6/2002 |
| EP | 2062797 A2 | 5/2009 |
| JP | 2004251456 A | 9/2004 |
| JP | 2009262766 A | 11/2009 |
| JP | 2011126425 A | 6/2011 |
| JP | 2011207410 A | 10/2011 |
| JP | 2013515215 A | 5/2013 |
| WO | 2012002056 A1 | 1/2012 |

OTHER PUBLICATIONS

International Search Report (dated Jul. 6, 2015) for corresponding International App. PCT/EP2014/025008.
Chinese Official Action (dated Nov. 16, 2018) for corresponding Chinese App. 201480082145.9.
Japanese Official Action (dated Sep. 27, 2018) for corresponding Japanese App. 2017-518896.

* cited by examiner

METHOD TO CONTROL A POWERTRAIN IN A VEHICLE

BACKGROUND AND SUMMARY

The invention relates to a method for controlling a powertrain in a vehicle during acceleration. The invention involves limiting the vehicle acceleration by controlling the powertrain if the estimated time between the two sequential power shifts is shorter than a predetermined time limit.

The invention can be applied in heavy-duty vehicles, such as trucks, buses and construction equipment. Although the invention will be described with respect to a truck, the invention is not restricted to this particular vehicle, but may also be used in other vehicles such as buses, construction equipment and other work vehicles.

Automatic and semi-automatic mechanical transmission systems for vehicles are well known in the prior art. Typically, such systems comprise a multi-speed mechanical change gear transmission, at least one friction clutch drivingly interposed the engine and the transmission and a central processing unit or controller for receiving input signals from sensors and issuing command output signals to actuators for operating the transmission. In a multi-clutch transmission such as a dual clutch transmission (DCT), power shifting may be preferred in most situations. During power shifting the gear shifts will occur sequentially and the clutches will be actuated alternately to give smooth gear changes.

Vehicles provided with multi-clutch transmissions are provided with a controller that will control the operation of the clutch based on a gear strategy stored in the control unit. The gear shifting strategy may under certain circumstances select a skip shift, e.g. between two even gears, requiring the same clutch to be used. Skip up-shifts can be demanded in situations when powerful vehicle acceleration is performed. During an acceleration the engine speed after a power up-shift can be higher than or near the next up-shift speed, leading to a short time between successive upshifts and an increase in number of gear shifts. The skip shifts are used in order to avoid a series of rapid single up-shifts by shifting directly into a desirable lower gear ratio.

However, skip shifts result in power cut-off gear changes which are less comfortable for the driver and may increase the risk of wheel spin. As a rule, drivers prefer to use power shifts as often as possible.

Hence it is desirable to provide an improved method for controlling a multi-clutch transmission that overcomes the above problem.

It is desirable to provide a method for controlling a multi-clutch transmission in a vehicle, which method allows skip up-shifts to be avoided during vehicle acceleration.

The invention relates, according to an aspect thereof, to a method for controlling a powertrain in a vehicle during acceleration. The powertrain comprises a propulsion unit, a multi-clutch transmission drivingly connected to the propulsion unit, and an electronic control unit for controlling at least the powertrain components. The electronic control unit is provided with a prediction model comprising at least one simulated shift sequence for the multi-clutch transmission. The multi-clutch transmission is preferably a dual clutch transmission.

The method involves performing method steps of:
monitoring at least one operating parameter of the powertrain;
estimating the time between initiation of a first power upshift and initiation of a sequential second power upshift using the prediction model; and,
if the estimated time between the initiation of two sequential power shifts is shorter than a predetermined time limit, controlling the propulsion unit to limit the vehicle acceleration so that the estimated time between sequential power shifts is increased to be at least equal to the predetermined time limit.

The predetermined time limit is at least equal to the minimum time in which a power shift can be performed. This time is measured from the actuation of a first clutch, when a first power upshift is initiated, to the actuation of a second clutch, when a second power upshift is initiated. In this context, initiation of a first power upshift will involve actuation of a first clutch to engage the next gear in a sequence of gears, while at the same time deactivation of a second clutch to disengage a currently engaged gear. Similarly, initiation of a second power upshift will involve actuation of the second clutch and deactivation of the first clutch. This alternate clutch actuation is desirable for achieving smooth and uninterrupted sequential gear shifting in the multi-clutch transmission.

If the estimated time between initiation of a first power upshift and a sequential second power upshift is equal to or greater than the predetermined time limit then no action is taken and a power upshift to the next sequential gear is performed as normal. However, if the estimated time indicates that there is too little time for a power upshift between the estimated timing of the first and second gearshifts, then the gear strategy will carry out the final method step to limit the vehicle acceleration. This will delay the next power shift to allow the first power upshift to be completed before the second power upshift is initiated.

The predetermined time limit is preferably selected greater than the minimum time to perform a power shift. A longer time is selected to allow the transmission to run on each gear for a period of time to prevent excessive clutch slipping between consecutive clutch actuations and to avoid overheating of the clutches. A suitable predetermined time limit can be selected dependent on engine output power, vehicle size/load, clutch cooling capacity, or a similar suitable parameter. The predetermined time limit is also dependent on the time required by the transmission for preparing for the next power shift.

A limitation of the acceleration is preferably performed prior to the initiation of the first power upshift. Alternatively the limitation of the acceleration may be performed during a power upshift. This latter case will result in a longer time on the current gear due to the fact that the propulsion unit speed will be lowered immediately after the upshift. However, it will also give lower comfort as a part of the torque will be reduced during the gearshift. It will be something between a power cut-off shift and a power shift when it comes to torque reduction during the shifts. According to a further alternative, a combination of these two methods can be used, wherein the limitation of the acceleration is initiated prior to the initiation of the first power upshift and completed during the upshift. In all these cases the limitation of the acceleration will cause a delay to provide sufficient time for a power upshift, in order to avoid a skip shift.

The invention, according to an aspect thereof, is applicable to propulsion units comprising an internal combustion unit, a motor/generator, or a hybrid electric propulsion unit combining an internal combustion unit and a motor/generator connected to the multi-clutch transmission. When the propulsion unit comprises an internal combustion unit, the acceleration can be limited by injecting less fuel into the propulsion unit. When the propulsion unit comprises a motor/generator, the acceleration is limited by reducing electric power to the propulsion unit. Finally, when the powertrain comprises a hybrid electric propulsion unit, the acceleration is limited by driving an electric motor/generator using an internal combustion unit to regenerate energy. The regenerated energy can be stored in a battery, a super capacitor, or in any other suitable accumulator or energy storage device.

A reduction of the torque generated by the propulsion unit will reduce the input torque available to the multi-clutch transmission, thereby limiting the acceleration of the vehicle. The predetermined time limit is equal to the minimum time required for performing a power shift sequence. The control unit will use the prediction model comprising at least one simulated shift sequence for the multi-clutch transmission to calculate the output power reduction required to limit the vehicle acceleration so that the time between two sequential power upshifts is increased to be at least equal to the predetermined time limit.

The method can further involve monitoring at least one powertrain operating parameter comprising one or more of propulsion unit speed (rpm) and/or vehicle speed, using suitable sensors connected to the control unit. Further operating parameters can include an accelerator position, indicating an acceleration request from the driver, and/or road information, such as a current road gradient, which information can comprise GPS data stored on-board in the vehicle or data supplied from a centralized system.

The invention also relates, according to an aspect thereof, to a transmission control system comprising a control unit arranged for controlling a multi-clutch transmission in a vehicle, wherein the control unit is programmed to perform the above-mentioned method steps.

The invention further relates, according to an aspect thereof, to a computer program comprising program code means for performing the steps for controlling a powertrain in a vehicle when said program is run on a computer.

The invention further relates, according to an aspect thereof, to a computer readable medium carrying a computer program comprising program code means for performing the above-mentioned method steps for controlling a powertrain in a vehicle when said program product is run on a computer.

The invention further relates, according to an aspect thereof, to a control unit for controlling a powertrain in a vehicle, the control unit being configured to perform the above-mentioned method steps.

The invention, according to an aspect thereof, aims to achieve more power shifts under driving conditions when high acceleration is requested. The inventive concept involves increasing the time between upshifts by limiting the torque applied on the wheels, thereby limiting the acceleration, either by limiting the output torque from the propulsion unit or by using a portion of the output torque for regenerating energy, e.g. for charging batteries or super capacitors.

The invention, according to an aspect thereof, has the advantages of improving driveability and providing a more constant acceleration, resulting in a more constant torque on the wheels and less risk for slipping.

Further advantages and advantageous features of the invention are disclosed in the following description and in the dependent claims.

BRIEF DESCRIPTION OF THE DRAWINGS

With reference to the appended schematic drawings, below follows a more detailed description of embodiments of the invention cited as examples. In the drawings.

DETAILED DESCRIPTION

Figure 1:
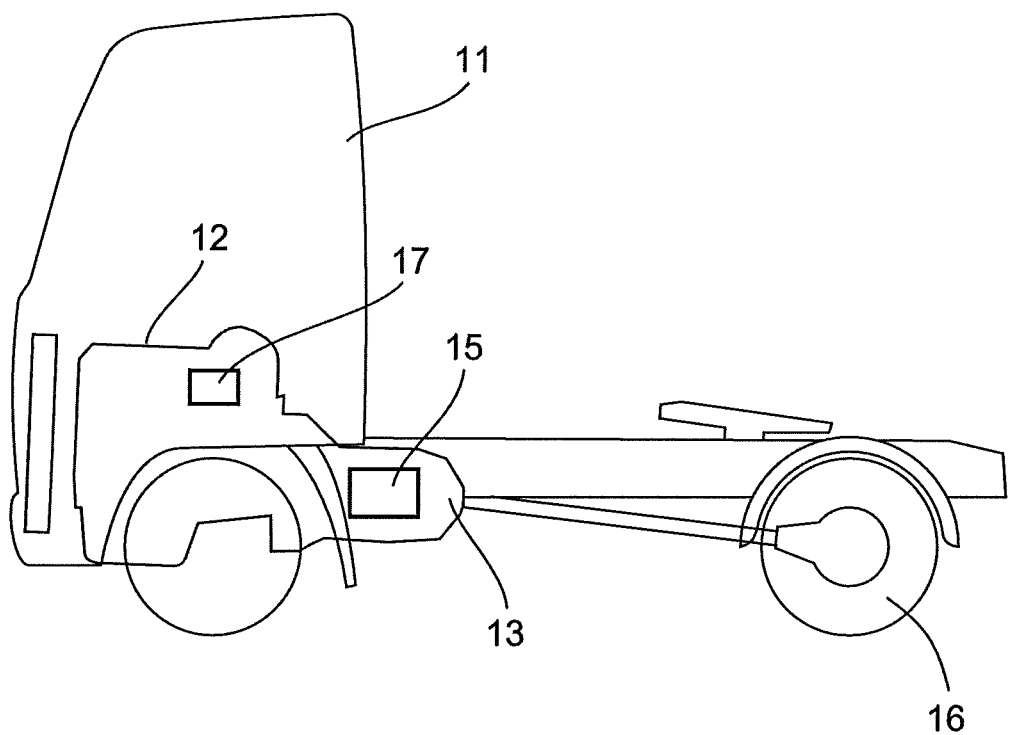
FIG. 1 shows a schematically indicated vehicle 11 with a transmission arrangement for use with a method according to the invention.

FIG. 1 shows a schematically indicated vehicle 11 with a transmission arrangement for use with a method according to an aspect of the invention. The vehicle 11 is provided with an internal combustion engine (ICE) 12 connected to a transmission 13 comprising a dual clutch arrangement 15, for transmitting torque to an output drive shaft (not shown). In the subsequent text this transmission will be referred to as a dual clutch transmission (DCT) 13. The ICE 12 is connected to a radiator arrangement 14 for cooling engine coolant and oil from the ICE 12 and the transmission 14. The transmission 13 is controlled by the driver or automatically via an electronic control unit (ECU) 17. The ECU 17 is provided with control algorithms for controlling the transmission independently during, for instance, an engine start requested by the driver. The transmission is controlled to select a gear ratio between the engine 12 and a pair of driven wheels 16.

Figure 2:
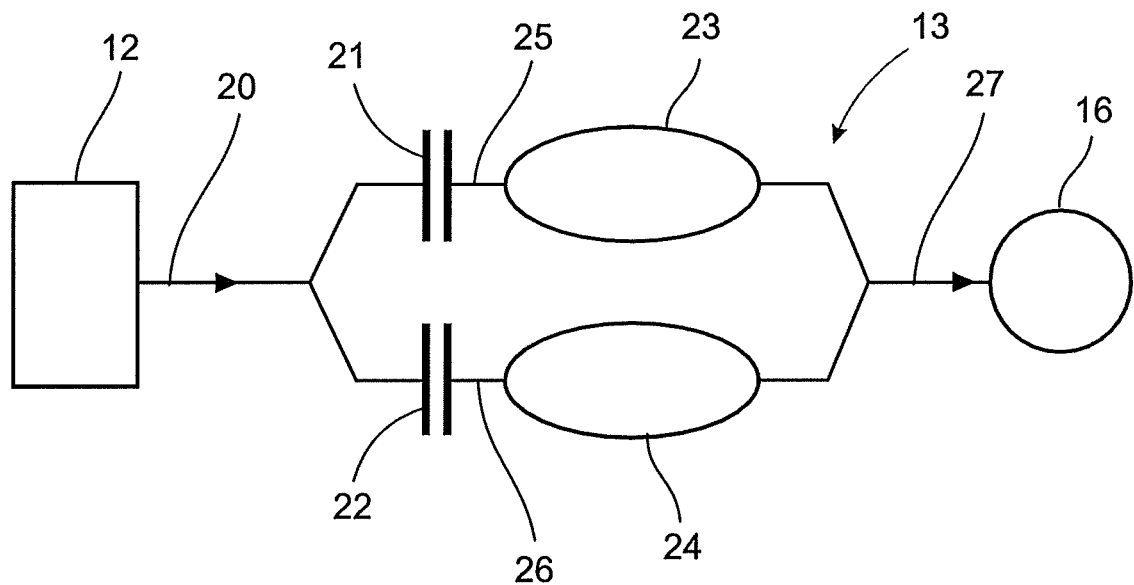
FIG. 2 shows a schematic diagram of a transmission arrangement suitable for use in a vehicle as indicated in FIG. 1.

FIG. 2 shows a schematic, diagram of a transmission arrangement suitable for use in a vehicle as indicated in FIG. 1. The engine 12 has an output shaft 20 that is connected to the transmission 13. The transmission 13 comprises a dual clutch arrangement having a first and a second clutch 21, 22, respectively. The first clutch 21 is controlled by the electronic control unit 7 (FIG. 1) to connect the crankshaft 20 to a first gearbox unit 23, comprising a first input shaft 25, an output shaft and a number of gears (not shown) that can be actuated for controlling the gear ratio between the engine 12 and the driven wheels 16. A lubrication pump (not shown) is provided in the first transmission 23 and is drivingly connected toile first clutch 21. Similarly, the second clutch 22 can be controlled to connect the crankshaft 20 to a second gearbox unit 24, comprising a second input shaft 26, an output shaft and a number of gears (not shown) that can be actuated for controlling said wear ratio. The mechanical design of the first and second gearbox units 23, 24 is not part of the invention per se and will not be described in further detail. Using the first and a second clutches 21, 22 in turn, the gears of the first and second gearbox units 23, 24 can be used for driving the wheels 16 via a drive shaft 27.

The electronic control unit 17 is connected to a number of existing sensors (not shown) for detecting and monitoring the lubrication and/or temperature of each clutch and the shafts and gears of the transmission. Examples of sensors are temperature sensors for measuring oil temperature and/or bearing temperature in one or more locations, oil level sensors for monitoring oil levels in one or more locations, as well as other suitable sensors for determining the lubricated state of the transmission. Data collected by the electronic control unit 17 is used as a basis for determining the lubricated state of the clinches during a number of sequential power upshifts.

Figure 3:
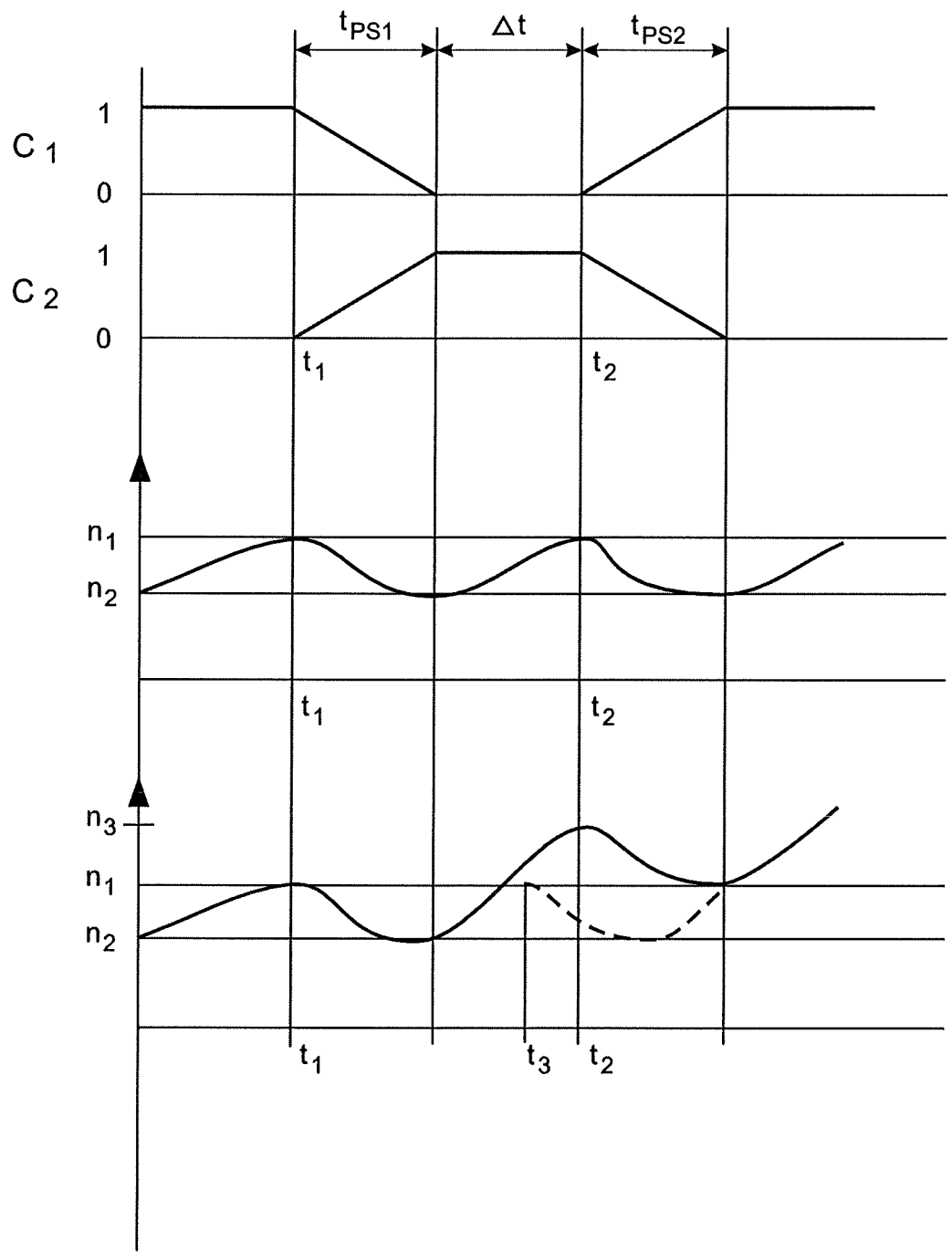
FIG. 3 shows a schematic diagram indicating clutch actuation and engine speed over time.

FIG. 3 shows a schematic diagram indicating clutch actuation for a first and a second clutch C1, C2 in a dual clutch transmission. In FIG. 3, clutch actuation and engine speed is plotted over time during sequential power'upshifts for different acceleration scenarios. The first clutch C1 is actuated (1) or deactivated (0) to control the uneven gears (1, 3, 5, etc.) and the second clutch C2 is simultaneously deactivated (0) or actuated (1) to control the even gears (2, 4, 6, etc.) in a dual clutch transmission.

As shown in FIG. 3, initiation of a first power upshift at t1 will involve deactivation of the first clutch C1 to disengage a currently engaged uneven gear, while at the same time actuating of the second clutch C2 to engage a sequential even gear, The time required for this operation is indicated as tPS1. Upon completion of a first power upshift PS1 the transmission requires a minimum time Δt to prepare and set up the gears for the next sequential power shift. The minimum time Δt can vary depending on factors such as the type of transmission and shift fork actuation speed. In a standard DCT Δt can be up to 2 s. Subsequently, initiation of a second power upshift PS2 at t2 will involve activation of the first clutch C1 to engage a sequential uneven gear, while at the same time deactivating of the second clutch C2 to disengage a currently engaged even gear. The time required for this operation is indicated as tPS2.

Immediately below the clutch actuation diagram, FIG. 3 shows the engine speed over time during the corresponding power shifts PS1 and PS2. During acceleration, the engine speed approaches a desired maximum engine speed n1 at which a gear change should be carried out. When the first power upshift PS1 is performed at t1 the engine speed drops to a lower engine speed n2 during the period tPS1. Examples of values for the upper and lower engine speeds are 1600 and 1500 rpm, respectively. The vehicle will continue to accelerate during the first power upshift PS1. When the first power upshift PS1 has been completed the engine speed will again increase towards the desired maximum engine speed n1, at which the second power upshift PS2 is performed at t2. In order to maintain optimum fuel economy, the engine speed should preferably not exceed the desired engine speed n1. During this process the vehicle speed will increase at a constant rate and have a slope, corresponding to the vehicle acceleration, which does not exceed a predetermined value. The driver will experience this sequence of power shifts as a continuous acceleration without power cut-off.

The second engine speed diagram illustrates a case where the driver requests an acceleration that is higher than a permissible acceleration for achieving optimum fuel economy. From the second diagram it can be seen that the engine, speed approaches the desired maximum engine speed n1 at a higher rate. The first power upshift PS1 is performed at t1 he engine speed drops to a lower engine speed n2 during the period tPS1. However, after the first power shift PS1 the engine speed increases too fast and will pass the desired maximum engine speed n1 before the minimum time Δt required to prepare and set up the gears for the next sequential power shift has passed. The consequence is that the engine speed will overshoot the desired engine speed and increase to a higher engine speed n3 before the minimum time Δt has passed and a second power upshift can be performed at t2. As can be seen from FIG. 3, the engine speed will continue to increase every time the transmission is power shifted up through the gears. Compared to the first example, the second power upshift PS2 will be performed at 1700 rpm instead of 1600 rpm. This will increase fuel consumption, and the higher engine speeds can cause more wear in the engine.

Normally, this condition would be avoided by performing a skip-shift when the desired engine speed n1 is reached. A skip shift is used to change gears from, for instance, one uneven, gear (1, 3, 5) to the next uneven gear (3, 5, 7). During this process, the vehicle speed will increase at a varying rate, as there will be a power cut-off during each gear change. Between gear changes the speed increase will have a slope, i.e. an acceleration in excess of the predetermined value. The driver will experience this sequence of power shifts as being uncomfortable and jerky due to the power cut-off during gear changes.

Figure 4:
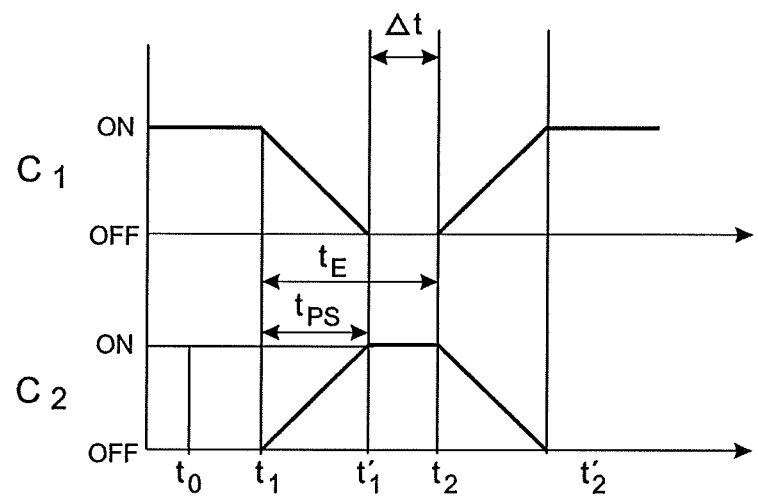
FIG. 4 shows a schematic diagram indicating clutch actuation timing.

FIG. 4 shows a schematic diagram indicating clutch actuation timing for a first and a second clutch C1, C2 in a dual clutch transmission. In FIG. 4, clutch actuation is plotted over time during sequential power upshifts. In this example, the first clutch C1 controls the uneven gears (1, 3, 5, etc.) and the second clutch C2 controls the even gears (2, 4, 6, etc.) in the dual clutch transmission.

In the example shown in FIG. 4 it is assumed that the first clutch C1 is active, i e torque is transmitted. A control snit (see FIG. 1) is arranged to monitor at least one operating parameter of the powertrain using suitable sensors to detect that a power upshift will be required. When this is detected at the time to the control unit will estimate the time period between a first power upshift, at the time t1, and a sequential second power upshift, at the time t2, using a prediction model stored in the control unit. An estimated time tE between the times t1 and t2 should be at least equal to a predetermined time limit tLIM.

The predetermined time limit tLIM is at least equal to the minimum time tPS in which a power shift can be performed. This time is measured from the actuation of a first clutch, when a first power upshift is initiated at t1, during the time period Δt when the transmission prepares the next power upshift and up to the actuation of a second clutch, when a second power upshift is initiated at t2. In the example in FIG. 4, initiation of a first power upshift at t1 will involve deactivation of the first clutch C1 to disengage a currently engaged uneven gear, while at the same time actuating of the second clutch C2 to engage a sequential even gear. The first power upshift is completed at the time t'1. Similarly, initiation of a second power upshift will involve actuation of the first clutch C1 and deactivation of the second clutch C2 at the time t2. The second power upshift is completed at the time t'2. Hence, the time tPS required to complete a power upshift is equal to (t'1−t1) or (t'2−t2), respectively.

If the estimated time tE between a first power upshift and a sequential second power upshift is equal to or greater than the predetermined time limit tLIM then no action is taken to control vehicle acceleration and a power upshift to the next sequential gear is performed as normal. However, if the estimated time tE indicates that there is too little time for a power upshift between the estimated first and second gearshifts, then the gear change strategy will carry out a limitation of the vehicle acceleration. The acceleration can be limited by injecting less fuel into the propulsion unit. When the propulsion unit comprises a motor/generator, the acceleration is limited by reducing electric power to the propulsion unit. Finally, when the powertrain comprises a hybrid electric propulsion unit, the acceleration is limited by driving an electric motor/generator using an internal combustion unit to drive the motor/generator and regenerate energy. The regenerated energy can be stored in a battery, a super capacitor, or in any other suitable accumulator or energy storage device.

Figure 5:
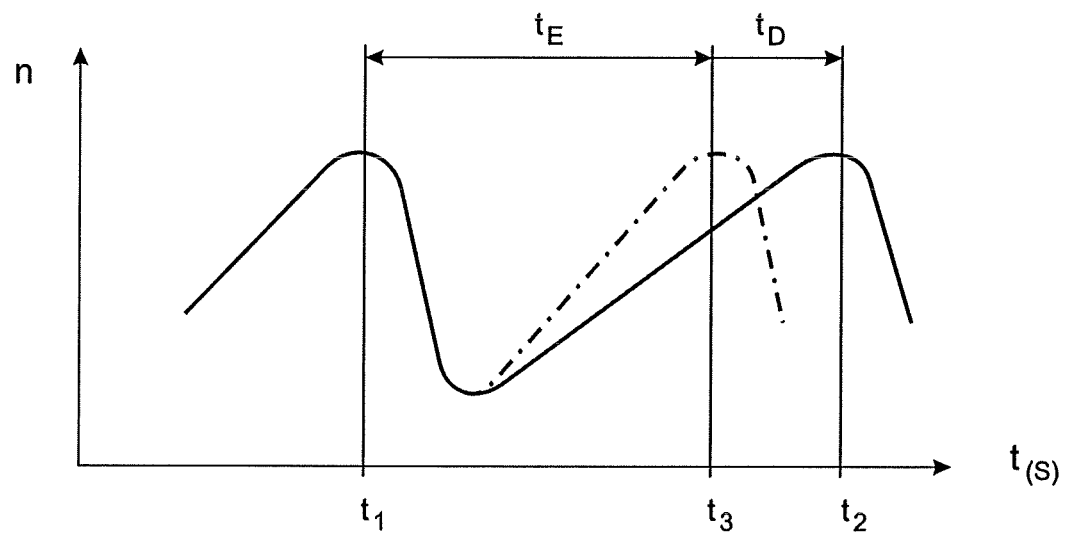
FIG. 5 shows a schematic diagram indicating engine speed over time.

FIG. 5 shows a schematic diagram indicating engine speed over time. The figure shows the effect of the acceleration limitation on the engine speed. As can be seen from the figure, the engine speed will increase up to the time t1, when the control unit has estimated that a first power upshift will be required. The control unit will also have used the prediction model stored in the control unit to determine the estimated time tE to the second power upshift at a time t3 under the current operating conditions and the current acceleration (see dash-dotted line in FIG. 5). If the estimated time tE indicates that there is too little time for a power upshift between the estimated first and second gearshifts, then the gear change strategy will carry out a limitation of the vehicle acceleration. This will cause a delay tD of the next power shift to allow the first power upshift to be completed and a subsequent power upshift to be prepared before the second power upshift is initiated at time t2. The period of delay tD is selected so the estimated time tE plus the delay tD is equal to the predetermined time limit tLIM.

The predetermined time limit is preferably selected greater than the minimum time to perform a power shift. A longer time is selected to allow the transmission to run on each gear for a period of time Δt (FIG. 4) to prevent excessive clutch slipping between consecutive elute actuations and to avoid overheating of the clutches. A suitable predetermined time limit tLIM can be selected dependent on engine output power, vehicle size/load, clutch cooling capacity, or a similar suitable parameter. The example in FIG. 4 shows a case where the predetermined time limit tLIM is equal to the time tPS required to complete a power upshift plus the period of running time Δt selected to prevent excessive clutch wear.

Figure 6A:
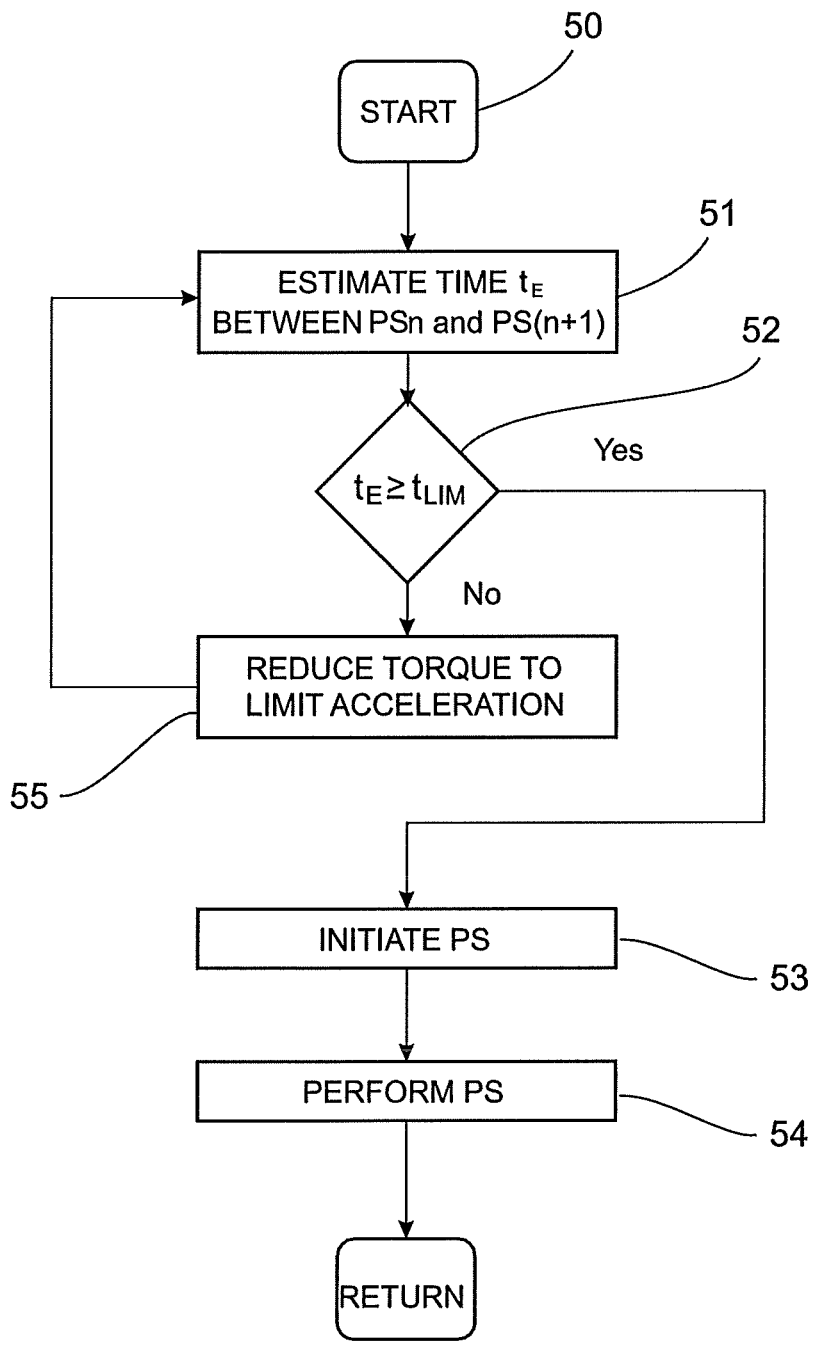
FIG. 6A shows a flow diagram for the method steps performed when carrying out the method according to the invention.

FIG. 6A shows a flow diagram for the method steps performed when carrying out the method according to an aspect of the invention. The method involves monitoring at least one operating parameter of the powertrain. When it is detected that an acceleration is requested that will involve power upshifts, the process is started 50. The method uses a control unit that is provided with a prediction model comprising at least one simulated shift sequence for the multi-clutch transmission for predicting future gear changes, as described above.

In a first step 51, an estimation of the time tE, between a first power upshift PSn and a sequential second power upshift PS(n+1) using the prediction model stored in the control unit. In a second step 52, the estimated time tE is compared to a predetermined time limit tLIM. If the estimated time tE between the two sequential power shifts PSn and PS(n+1) is equal to or greater than the predetermined time limit tLIM, then the process continues to a third step 53 in which a subsequent power upshift can be initiated and a fourth step 54 where the power upshift is performed.

If the estimated time tE between the two sequential power shifts is shorter than the predetermined time limit tLIM, then the process will proceed from the second step 52 to an alternative step 55. In this step 55 the control unit will carry out a limitation of the vehicle acceleration. The process will then return to the first and second steps 51, 52 and an iterative closed loop process is repeated until the condition tE≥tLIM is fulfilled in the second step 52. As soon as this condition is fulfilled a power shift can be initiated and performed. The method is performed for each subsequent power upshift as the vehicle is accelerated.

Figure 6B:
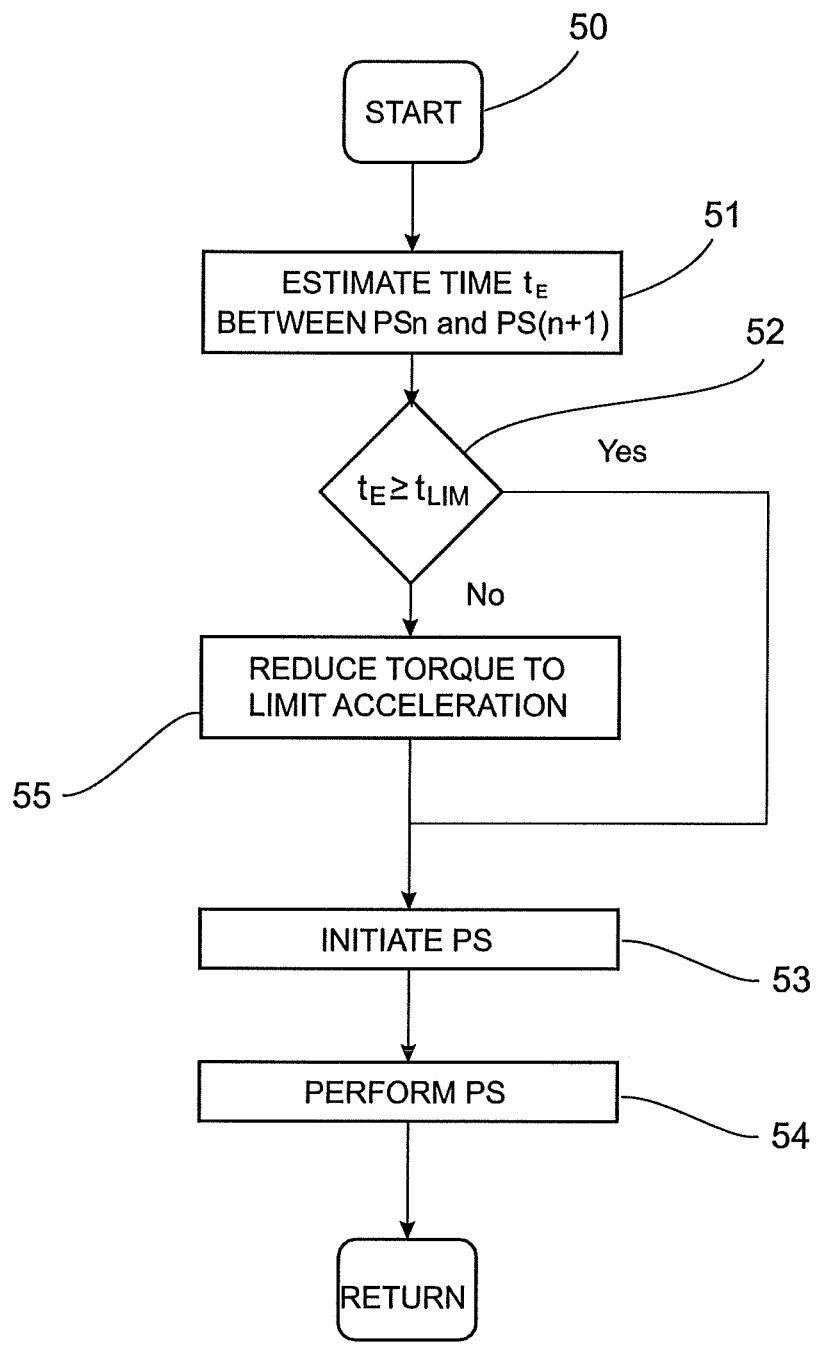
FIG. 6B shows an alternative flow diagram for the method steps performed when carrying out the method according to the invention.

FIG. 6B shows an alternative flow diagram fir the method steps performed when carrying out the method according to an aspect of the invention. As described above, the method involves monitoring at least one operating parameter of the powertrain. When it is detected that an acceleration is requested that will involve power upshifts, the process is started 50. The method uses a control unit that is provided with a prediction model comprising at least one simulated shift sequence for the multi-clutch transmission for predicting future gear changes, as described above.

In a first step 51, an estimation of the time tE between a first power upshift PSn and a sequential second power upshift PS(n+1) using the prediction model stored in the control unit. In a second step 52, the estimated time tE is compared to a predetermined time limit tLIM. If the estimated time tE between the two sequential power shifts PSn and PS(n+1) is equal to or greater than the predetermined time limit then the process continues to a third step 53 in which a subsequent power upshift can be initiated and a fourth step 54 where the power upshift is performed.

If the estimated time tE between the two sequential power shifts is shorter than the predetermined time limit tLIM, then the process will proceed from the second step 52 to an alternative step 55. In this step 55 the control unit will carry out a limitation of the vehicle acceleration. The process will use values from a stored map in the control unit to control the engine so that the condition tE≥tLIM is fulfilled. As soon as the acceleration limitation has been implemented a power shift can be initiated and performed. The method is performed for each subsequent power upshift as the vehicle is accelerated.

Figure 7:
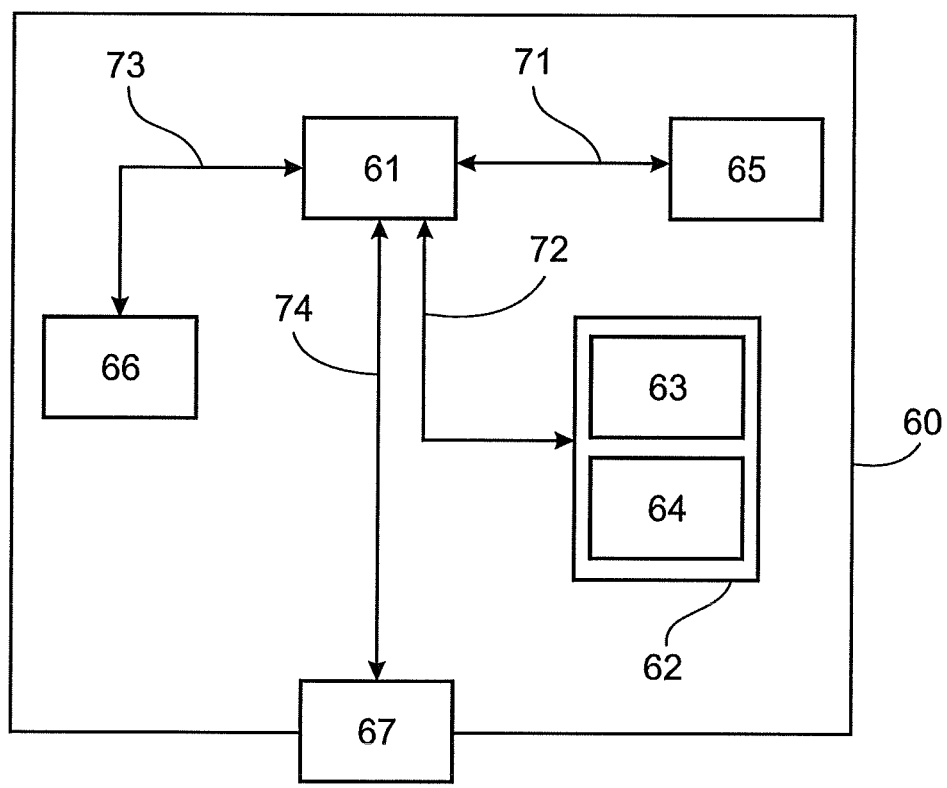
FIG. 7 shows a schematic apparatus used for carrying out the method according to the invention using a computer.

The present invention also relates to a computer program, computer program product and a storage medium for a computer all to be used with a computer for executing the method as described in any one of the above examples. FIG. 7 shows a schematic apparatus used for carrying out the method according to an aspect of the invention using a computer.

FIG. 7 shows an apparatus 60 according to one embodiment of the invention, comprising a non-volatile memory 62, a processor 61 and a read and write memory 66. The memory 62 has a first memory part 63, in which a computer program for controlling the apparatus 60 is stored. The computer program in the memory part 63 for controlling the apparatus 60 can be an operating system.

The apparatus 60 can be enclosed in, for example, a control unit, such as the control inn 17 in FIG. 1. The data-processing unit 61 can comprise, for example, a microcomputer.

The memory 62 also has a second memory part 64, in which a program for controlling the acceleration limiting function according to an aspect of the invention is stored. In an alternative embodiment, the program for controlling the acceleration limiting function is stored in a separate non-volatile storage medium 65 for data, such as, a CD or an exchangeable semiconductor memory. The program can be stored in an executable form or in a compressed state.

When it is stated below that the data-processing unit 61 runs a specific function, it should be clear that the data-processing unit 61 is running a specific part of the program stored in the memory 64 or a specific part of the program stored in the non-volatile storage medium 62.

The data-processing unit 61 is tailored for communication with the storage memory 62 through a first data bus 71. The data-processing unit 61 is also tailored for communication with the memory 62 through a second data bus 72. In addition, the data-processing unit 61 is tailored for communication with the memory 66 through a third data bus 73. The data-processing unit 61 is also tailored for communication with a data port 67 by the use of a fourth data bus 74.

The method according to the present invention can be executed by the data-processing unit 61, by the data-processing unit 61 running the program stored in the memory 64 or the program stored in the non-volatile storage medium 65.

The control unit 17 can be arranged in different positions of the vehicle, such as the ICE 12, the transmission 13 or other parts of the vehicle. The inventive function can be stored in one control unit or in several different control units of the vehicle.

It is to be understood that the present invention is not limited to the embodiments described above and illustrated in the drawings; rather, the skilled person will recognize that many changes and modifications may be made within the scope of the appended claims.

The invention claimed is:

1. Method to control a powertrain in a vehicle during a vehicle acceleration, the powertrain comprising a propulsion unit, a multi-clutch transmission drivingly connected to the propulsion unit, and a control unit for controlling at least the powertrain components, the control unit is provided with a prediction model comprising at least one simulated shift sequence for the multi-clutch transmission, comprising:
    monitoring at least one operating parameter of the powertrain;
    calculating a time limit based on the at least one operating parameter of the powertrain;
    estimating a time between initiation of a first power upshift and initiation of a sequential second power upshift using the prediction model; and
    controlling the propulsion unit to limit the vehicle acceleration prior to initiation of the first power upshift so that the time between initiation of the first power upshift and initiation of the sequential second power upshift is always at least equal to the time limit, wherein the propulsion unit is controlled to limit the vehicle acceleration by one of more of
    injecting less fuel into an internal combustion unit propulsion unit,
    reducing electric power to a motor/generator propulsion unit, and
    driving an electric motor/generator of a hybrid electric propulsion unit to regenerate energy.

2. The method according to claim 1, wherein the time limit is at least equal to a minimum time required for performing a power shift sequence.

3. The method according to claim 1, wherein the time limit is greater than a minimum time required for performing a power shift sequence.

4. The method according to claim 1, wherein the time limit is at least equal to a sum of a minimum time required for performing a power shift sequence plus a time required to prepare the multi-clutch transmission for a subsequence power shift.

5. The method according to claim 1, comprising monitoring at least on powertrain operating parameter comprising one or more of propulsion unit speed, vehicle speed, an accelerator position, and/or road information.

6. A computer comprising a computer program for performing, when the computer program is run on the computer, a method to control a powertrain in a vehicle during a vehicle acceleration, the powertrain comprising a propulsion unit, a multi-clutch transmission drivingly connected to the propulsion unit, and a control unit for controlling at least the powertrain components, the control unit is provided with a prediction model comprising at least one simulated shift sequence for the multi-clutch transmission, the method comprising:
    monitoring at least one operating parameter of the powertrain;
    calculating a time limit based on the at least one operating parameter of the powertrain;
    estimating a time between initiation of a first power upshift and initiation of a sequential second power upshift using the prediction model; and
    controlling the propulsion unit to limit the vehicle acceleration prior to initiation of the first power upshift so that the time between initiation of the first power upshift and initiation of the sequential second power upshift is always at least equal to the time limit, wherein the propulsion unit is controlled to limit the vehicle acceleration by one or more of
    injecting less fuel into an internal combustion unit propulsion unit,
    reducing electric power to a motor/generator propulsion unit, and
    driving an electric motor/generator of a hybrid electric propulsion unit to regenerate energy.

7. A control unit configured to perform a method to control a powertrain in a vehicle during an acceleration, the powertrain comprising a propulsion unit, a multi-clutch transmission drivingly connected to the propulsion unit, and the control unit for controlling at least the powertrain components, the control unit is provided with a prediction model comprising at least one simulated shift sequence for the multi-clutch transmission, the method comprising:
    monitoring at least one operating parameter of the powertrain;
    calculating a time limit based on the at least one operating parameter of the powertrain;
    estimating a time between initiation of a first power upshift and initiation of a sequential second power upshift using the prediction model; and
    controlling the propulsion unit to limit the vehicle acceleration prior to initiation of the first power upshift so that the time between initiation of the first power upshift and initiation of the sequential second power upshift is always at least equal to the time limit, wherein the propulsion unit is controlled to limit the vehicle acceleration by one or more of
    injecting less fuel into an internal combustion unit propulsion unit,
    reducing electric power to a motor/generator propulsion unit, and
    driving an electric motor/generator of a hybrid electric propulsion unit to regenerate energy.

* * * * *